United States Patent
van de Ven (10) Patent No.: US 6,507,347 B1
(45) Date of Patent: Jan. 14, 2003

(54) SELECTED DATA COMPRESSION FOR DIGITAL PICTORIAL INFORMATION

(75) Inventor: Antony van de Ven, Kowloon (HK)

(73) Assignee: Lighthouse Technologies Ltd., Kowloon (HK)

( * ) Notice: Subject to any disclaimer, the term of this patent is extended or adjusted under 35 U.S.C. 154(b) by 0 days.

(21) Appl. No.: 09/534,363

(22) Filed: Mar. 24, 2000

(51) Int. Cl.$^7$ .......................... G09G 5/00; H03M 1/62; G06F 13/00; H04N 7/12; H04N 5/202

(52) U.S. Cl. .................. 345/619; 341/140; 710/33; 375/240.01; 348/254

(58) Field of Search ................. 348/254, 572, 348/573; 704/501; 382/252, 237, 239; 345/619, 202; 341/128, 129, 138, 140, 83; 709/247; 375/240.01, 240.26; 710/33, 34

(56) References Cited

U.S. PATENT DOCUMENTS

| | | | | |
|---|---|---|---|---|
| 3,678,504 A | * | 7/1972 | Kaneko | 341/138 |
| 3,909,824 A | * | 9/1975 | Fontanes | 341/140 |
| 4,023,159 A | * | 5/1977 | Miyakawa et al. | 341/140 |
| 4,532,495 A | * | 7/1985 | Gagnon | 341/110 |
| 4,668,988 A | * | 5/1987 | Sasaki et al. | 333/14 |
| 4,698,690 A | * | 10/1987 | Tanioka | 358/457 |
| 5,047,853 A | * | 9/1991 | Hoffert et al. | 375/240.01 |
| 5,086,484 A | * | 2/1992 | Katayama et al. | 358/465 |
| 5,128,757 A | * | 7/1992 | Citta et al. | 348/469 |
| 5,168,532 A | * | 12/1992 | Seppi et al. | 348/217 |
| 5,343,201 A | * | 8/1994 | Takayama et al. | 341/138 |
| 5,473,372 A | * | 12/1995 | Nobuoka et al. | 348/254 |
| 5,473,373 A | * | 12/1995 | Hwung et al. | 348/254 |
| 5,610,604 A | * | 3/1997 | Leacock et al. | 341/118 |
| 5,828,788 A | * | 10/1998 | Chiang et al. | 375/240.12 |
| 5,877,717 A | * | 3/1999 | Tu et al. | 341/138 |
| 5,907,370 A | * | 5/1999 | Suzuki et al. | 345/605 |
| 5,982,424 A | * | 11/1999 | Simerly et al. | 348/229 |
| 6,009,201 A | * | 12/1999 | Acharya | 382/232 |
| 6,195,029 B1 | * | 2/2001 | Urry et al. | 341/138 |
| 6,215,529 B1 | * | 4/2001 | Sugimoto et al. | 348/254 |
| 6,215,913 B1 | * | 4/2001 | Clatanoff et al. | 348/254 |
| 6,304,300 B1 | * | 10/2001 | Warren et al. | 348/674 |

OTHER PUBLICATIONS

Markandey et al, Texas Instruments Digital Video Products Group, "Video Processing for DLP. . . ", 13 pages, 1997.
Werner et al, Texas Instruments Inc., "Application of DLP Technology to Digital Electronic. . . ", 7 pages, 1997.

* cited by examiner

*Primary Examiner*—Jeffery Brier
*Assistant Examiner*—Ryan Yang
(74) *Attorney, Agent, or Firm*—Jacobson Holman PLLC (57) ABSTRACT

This invention provides a method and apparatus to selectively compress digital image data for the supply of that information to digital display screens or storage. The invention utilizes a digital input containing a non-linear representation between the value and the intended intensity and linearizes this into a higher order number. If the higher order number is below at least a first threshold, it is transmitted or stored on a lower order data system noting that the higher order bits or channels should all be zero. If the higher order value is above the threshold, the highest order bits of that value are transmitted or stored on the lower order data system so that only the lowest order bits are lost. The received input from the lower order data system can then be decoded and the data sent to drive a digital display or otherwise utilized. As the linearization process introduces substantial errors in the lower order numbers and minimal errors in the higher order numbers, this invention seeks to increase the accuracy of those lower order numbers by offsetting this against introducing some additional error into the higher order numbers. Further embodiments utilize multiple stages of compression.

20 Claims, 6 Drawing Sheets

Bit Offset Method for 10Bit

SELECTED DATA COMPRESSION FOR DIGITAL PICTORIAL INFORMATION

FIELD OF THE INVENTION

This invention relates to selected data compression for digital pictorial information and, in particular, the supply of digital information to digital display screens. This includes a variety of forms of digital display screen including large screen LED displays, LCD displays, LCD projectors, plasma television and similar forms of apparatus.

BACKGROUND TO THE INVENTION

Original video and television technology utilized analogue signals for the recording, transmission and driving of displays.

The cathode ray tubes (CRTs) still predominate the worldwide market for display apparatus in a form of televisions or similar. Therefore, it will be sometime before digital displays predominant to the extent that original data captured in the form of video, film or other analogue recording mechanisms are entirely replaced by digital mechanisms facilitating direct digital recording to digital transmission and reproduction.

The operation of a CRT is such that the brightness or intensity of a particular pixel on a screen is determined by the quantity of electrons accelerated by the cathode ray tube onto that point of the screen. However, the power or voltage supplied to the cathode ray tube leads to a non-linear response in the number of electrons accelerated.

This lack of linearity is well known and referred to as the gamma effect.

Different transmission or reproduction standards set different gamma functions to account for this lack of linearity. The gamma function not only varies between industry standards such as NTSC or PAL but also with proprietary brands of monitors and similar display technologies.

Current recording technologies can involve analogue cameras which themselves work on a non-linear basis and although they may need to be compensated to the particular gamma function of the display on which the signal is reproduced, there is little identifiable loss of definition during this compensation process.

If information is recorded in a digital form, various intensities are recorded by discreet binary numbers. For example, if the information is recorded using 8-bit technology, different levels of intensity are graduated according to the 256 possible binary numbers available in an 8-bit binary number. This is substantially a linear representation of the intensity. Therefore, to allow such digital information to be displayed utilizing conventional non-linear technology, it is necessary to add a gamma function to this information to provide a non-linear correlation between the intensity and the individual steps from each bit of information.

Regardless of the method of recording the data, as presented for reproduction, the data is likely to come in analogue or digital form having a gamma function. It is only if the recording process has been performed directly on digital equipment and no gamma function has been added as it is directly intended for use on a digital display that such a function may not exist. Transmissions by broadcast also benefit from a lack of linearity in reducing noise.

The result of this is that most digital displays need to work with such non-linear data.

When an analogue signal is received to represent pictorial information for a digital display, one of the first steps is to convert the analogue signal into digital information for processing. Whether converted from analogue or initially digital, the signal then needs to be linearized to remove the gamma function and provide the data in a manner that the digital display, that operates substantially linearly, will correctly represent the intended image. If the processed signal is supplied directly to the digital display, apparent visual distortions can occur in the low intensity colours. For low intensity colours, a single step in the binary information, once the gamma function has been removed, can lead to a distinct visual change in intensity. This leads to an effect referred to as mach banding where regions of low intensity colour approaching black can show distinct bands of colour where a single binary step in the digital information needs to represent a large percentage change in colour from the original non-linear signal. The reverse is true at high intensity colours so that in any high signal intensity colour that has the gamma function removed can easily be represented on a digital display. Large percentage errors between the anti-gamma digital representation and the non-linear signal occur at low intensity colours with minimal errors at the higher intensity colours.

To overcome this effect, different approaches have been taken in the past.

One approach is to use some error diffusion in the representation of the digital display. In effect, in an area where a band boundary would normally be apparent, some pixels in the lower intensity band are provided with the value of the higher intensity band and vice versa to provide the appearance of graduation in the intensities rather than any distinct step.

Although this effect can work for some digital displays, other digital displays utilize significantly larger and more apparent pixels. This may particularly be the case for large indoor or outdoor LED display screens where each individual pixel is a substantially larger unit and can be visually apparent on its own. Also, the total number of pixels in the display may be less in some displays making each individual pixel more important to the overall image. The use of error diffusion on such displays leads to a loss of definition rather than simply overcoming the banding.

The alternative course of action that is taken with most LED displays and indeed with other digital displays is to increase the accuracy of the digital information subsequent to removal of the gamma function by using an increased number of bits.

Typically, if an 8-bit digital signal is used as a direct representation of the nonlinear signal, an anti-gamma function needs to be applied to linearize the non-linear data. The application of this function loses some accuracy as the smaller binary numbers lose definition. For example, if an 8-bit signal provides a representation of the numeral 16 representing a small value of the 256 possible graduations, the application of the anti-gamma function may indicate that the true value should be, perhaps, 0.65. Such a number cannot be represented by a subsequent 8-bit binary number. Hence the output may simply be "1". Due to the nature of the anti-gamma calculation, the number 25 may normally equal 1.45 but still need to be represented as "1" in the recalculated linearized 8-bit data. This occurs only on those lower intensity values. Generally, the data will be truncated or rounded to lose significant digits.

Greater accuracy can be employed by outputting the 8-bit data, once the anti-gamma function has been applied as a 10-bit binary number to allow a greater degree of accuracy on these low intensity colours.

Of course, some systems utilize higher bits from the outset although such apparatus is naturally more expensive as greater processing abilities are needed throughout the entire system. The use of 8-bit technology has become a standard for the more economic forms of digital pictorial information such as a standard video.

The loss of definition in colours once the anti-gamma function is applied means that the original 8-bit information comprising some 256 discreet levels is reduced upon output. For an anti-gamma function of 2.2 which is substantially the standard for NTSC signals, only approximately 184 discreet output colours are possible using an 8-bit output. However, if the 8-bit input receives the anti-gamma function and is provided as a 10-bit output, approximately 233 colours are possible. With higher bit outputs, even more colours are available with a 16-bit output providing substantially the same 256 discreet colours which are considered sufficient to substantially correspond to an original analogue signal.

The difficulty in providing an increase in data bits once the anti-gamma function has been applied is that all the downstream equipment must similarly be able to transmit or process 10-bit data.

Again, looking specifically at the case of large screen LED displays, such displays are normally provided as a series of interconnectible display panels to allow easy shipment, assembly and standard control of the overall screen. The provision of 10-bit data paths to the control board on each discreet interconnectible segment of the screen would be relatively expensive. Therefore, the prior art solution is to provide the anti-gamma function and the increase to 10-bit data only once the data has reached each of the control boards provided on each interconnected segment of the screen. This decreases the need for expensive data paths to each segment of screen although increases the cost of the control boards as each control board must include suitable apparatus to perform this function. Generally this is facilitated through an Eprom provided on the board having an 8-bit input and a 10-bit output. The costs of supply connection, and programming of such Eproms on each individual board add significantly to the overall cost of the display screen.

OBJECT OF THE INVENTION

It is an object of the present invention to provide selected data compression for digital pictorial information to overcome some of these problems of the prior art or at least provide the public with a useful choice.

SUMMARY OF THE INVENTION

Accordingly, in the first aspect, the invention may broadly be said to consist in a method to transmit or store image data for display on a digital display system comprising:

applying an anti-gamma function to linearize an incoming data value and providing said linearized value as a higher order number;

receiving said linearized higher order number and, if below at least a first threshold value capable of being transmitted or stored on a lower order data system, transmitting or storing said linearized higher order number on said data system for use with a digital display system; and compressing said higher order numbers above said at least first threshold to also fit said lower order data system for storage or transmission and subsequent uncompression and use with said digital display system.

Preferably said at least first threshold value is set to a value less than or equal to a value transmittable or storable on a data system of n−1 channels where n equals the maximum order of the lower order data system.

Preferably higher order values above said first threshold are compressed to values transmittable or storable on a data system of n−1 channels where n equals the maximum order of the lower order data system.

Preferably said first threshold value is set to a value corresponding to a value represented by a single active bit in a binary sequence being a value of $2^x$ where x is a whole number.

Preferably x equals n−1.

Preferably said uncompressed and said compressed values are transmitted or stored on n−1 channels and the remaining channel is used to indicate the state of compression of the value.

Alternatively, m channels or bits are used as indicating bits and multiple compression states are utilized.

Accordingly, in a second aspect, the invention may broadly be said to consist in an apparatus to transmit or store image data for use with a digital display system comprising:

conversion means to apply an anti-gamma function and linearize a data value to a linearized higher order number;

selection means to select linearized higher order numbers below at least a first threshold value;

compression means to compress linearized higher order numbers above said at least first threshold value; and output means connectable to a lower order communication or storage system to transmit or store said selected and said compressed values.

Preferably said conversion, selection and compression is performed by a programmable memory apparatus.

Preferably said programmable memory apparatus comprises an Eprom.

Alternatively, said conversion, selection and compression may be performed, at least in part, by a logic circuit.

Preferably said selection selects according to at least a first threshold value less than or equal to the maximum value transmittable or storable on n−1 channels where n equals the order of said lower order communication or storage system.

Preferably said at least one remaining channels is used to indicate the compression state of the value.

Accordingly, in a third aspect, the invention may broadly be said to consist in an apparatus for the uncompression of transmitted or stored linearized data from a lower order data system into a higher order data system for use with a digital display where said linearized data comprises uncompressed values below at least a first threshold and compressed values above said at least first threshold and an indicating bit or bits to indicate the state of compression of the value comprising:

switching means driven by said indicating bit or bits to select between at least two separate logic operations for incoming linearized data values;

a direct output of said incoming value if said switching means indicates an uncompressed value has been received; and decoding bits of said lower order incoming values to higher order bits of said higher order data system if said indicating bit or bits indicate a compressed value.

Accordingly, in a fourth aspect, the invention may broadly be said to consist in a method for the uncompression of transmitted or stored linearized data from a lower order data system into a higher order data system for use with a digital display where said linearized data comprises uncompressed values below at least a first threshold and compressed values above said at least first threshold and an indicating bit or bits to indicate the state of compression of the value comprising:

utilizing said indicating portion to switch the output between at least two alternative inputs;

a direct output of the incoming value if the indicating portion indicates an uncompressed value; and decoding incoming data bits to higher order output data bits if said indicating bit or bits indicates a compressed value.

BRIEF DESCRIPTION OF THE DRAWINGS

Preferred embodiments of the invention will now be described with reference to the following drawings in which.

DETAILED DESCRIPTION OF PREFERRED EMBODIMENTS

This invention seeks to provide a method and apparatus for selectively compressing data for transmission or storage for use with a digital display system.

Although much of the description may refer to communication or transmission to a digital display for imminent use, it will be appreciated that the invention may be applied to data for storage prior to use on a display or system. This can include storage prior to use with pictorial editing software or other uses aside from direct display.

The difficulty with handling non-linear video signals can occur in the removal of the gamma function that is inherent in conventional cathode ray tube technologies.

The traditional non-linear video display provides a non-linear brightness response to the input voltage. This is referred to as the gamma function being the formula by which it is offset from a direct linear representation.

In general, digital displays provide a linear response to input voltage and, therefore, it is necessary to linearize the received non-linear data prior to its final provision to the digital display.

Digital representations of pictorial data often come in 8-bit form. This is a relatively economic form for providing and processing the data. Although an increase in data bits increases the accuracy of the information as more discreet steps in intensity or brightness are available, higher order processing and transmission significantly increases hardware costs.

In digitizing an analogue signal, it is common for the analogue signal to be converted to an 8-bit signal indicating 256 discreet steps of intensity. These 256 steps are considered to provide sufficient visual correlation to the pure analogue signal to be generally accepted in the industry. Alternatively, digital data usually already includes a gamma function to be non-linear data.

However, when the data is intended for use with a digital display or system, an additional step of linearization by applying an anti-gamma function is required.

Figure 1:
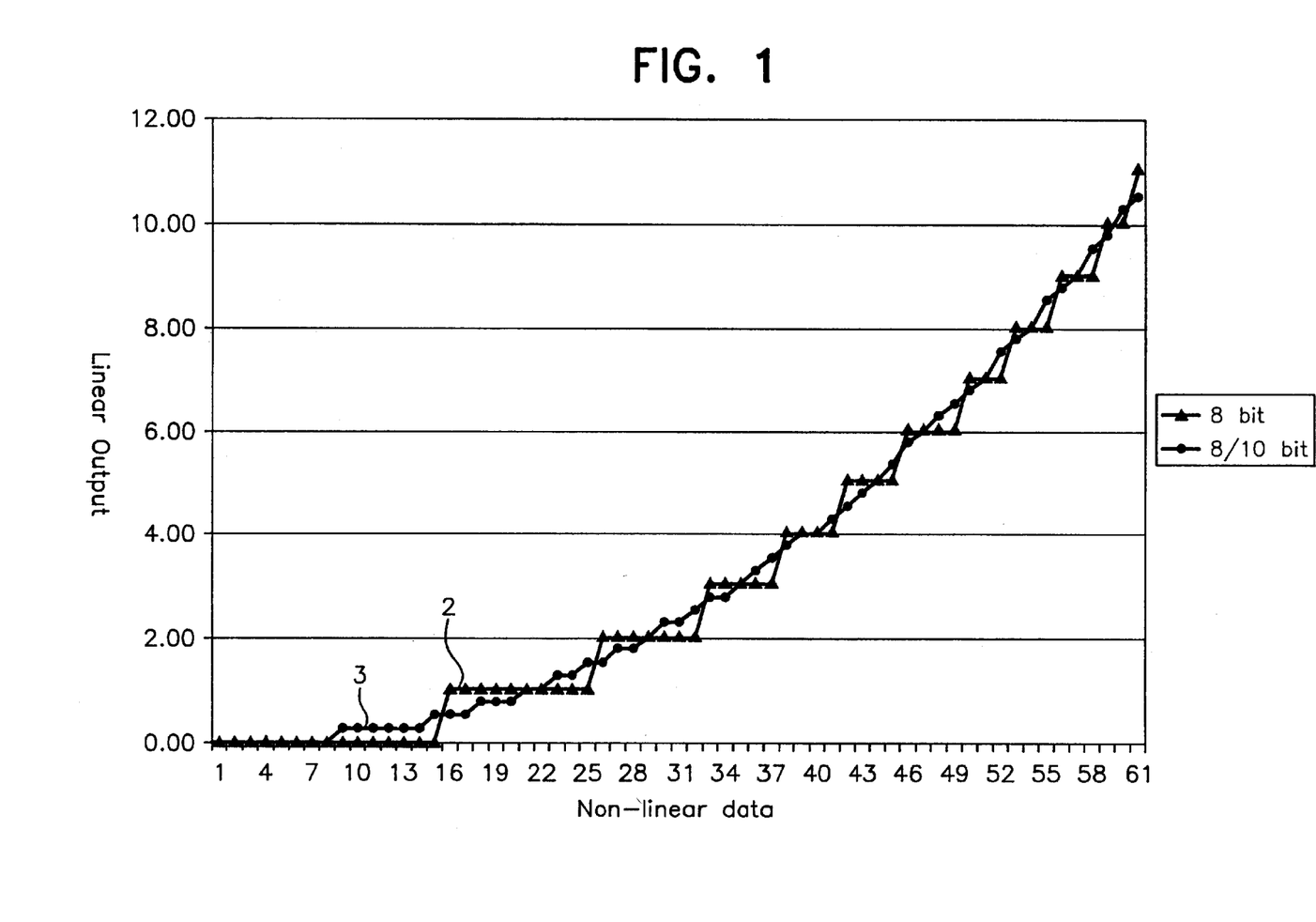
FIG. 1 is a diagrammatic plot of linearized values against non-linearized input values for 8 and 10-bit outputs.

Referring to FIG. 1, a diagrammatic plot is shown of the linear output once the anti-gamma function has been applied versus the non-linear input data.

FIG. 1 shows a first plot 2 relating to the linear output expressed as 8-bit data upon receiving the initial non-linear data, also in 8 bits.

It can be seen from the lack of linearity and the reduction in the absolute value of the low intensity numbers upon removal of the gamma function that significant accuracy can be lost on those low intensity numbers.

The non-linear data expressed at the bottom of the plot shows the values to 61 of the 256 discreet 8-bit input values. Upon application of the anti-gamma function, it can be seen that values from 0 to 15 will all equate to 0 when the output is in 8-bit form. In supplying the output in 8-bit form, it is not possible to express anything other than whole numbers to represent the solutions. The remainder is truncated or rounded. Similarly, all values between 16 and 25 on the input data will be represented by an output of 1.

As the plot progresses, it can be seen that increasing accuracy is achieved. The curve of the plot is such that the highest incoming non-linear data numbers correspond, in a single increment step, to more than a single increment step in the linearized output. There is a loss of significant digits in the lower order numbers and a redundancy of significant digits in the higher order numbers.

Throughout this specification, the term "order" is used to indicate the number of data bits etc., necessary to represent the value. In a binary system, the value 1023 requires 10 data bits whereas 255 can be expressed by 8 bits. The order of the values are taken to be 10 and 8 respectively for this description.

Also shown in FIG. 1 is the corresponding linear output plot if a 10-bit output 3 is used. Such 10-bit output has four incremental steps intermediate of the single incremental steps available in the 8-bit output to retain some significant digits and provide greater accuracy in these lower intensity values. Again, it will be realized that as higher intensity values are reached, even greater redundancy occurs in such 10-bit numbers with the lower order bits of the 10-bit numbers not being used to any significant effect.

Figure 2:
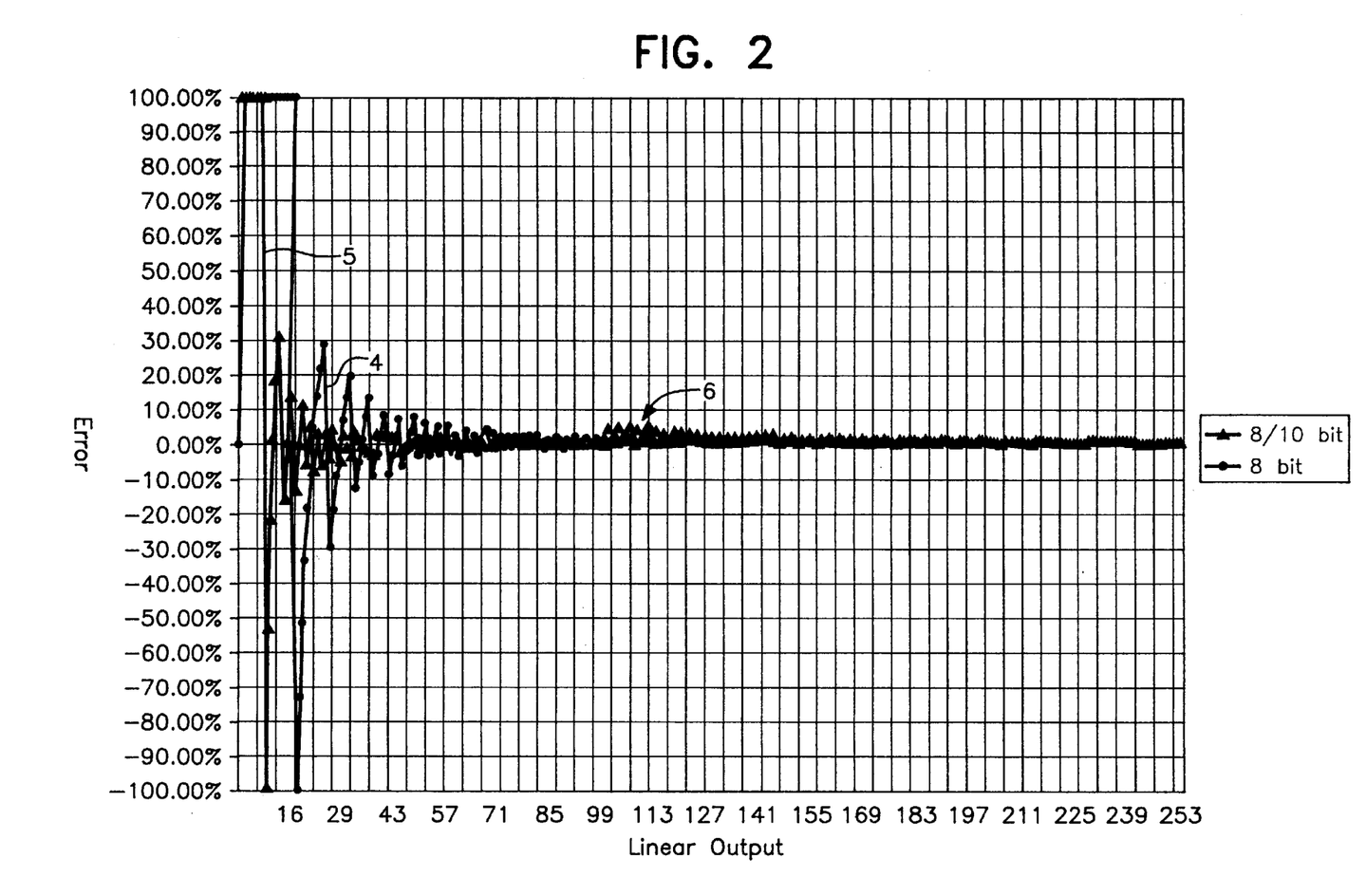
FIG. 2 shows a diagrammatic plot of potential errors versus non-linearized input data values for a conventional 8-bit linearized output and a compressed linearized output in accordance with this invention.

Referring to FIG. 2, the plot 4 is provided of the percentage error against the various non-linear input values. It can be seen that the plot 4 which corresponds to a conversion to an 8-bit output provides a large degree of error in the low intensity values that reduces rapidly to minimal errors in the higher intensity numbers.

Mapped against this is a further plot 5 that relates to the percentage error available from a preferred form of the present invention.

The present invention seeks to compensate for some of the large errors inherent in an 8-bit output by utilizing a 10-bit output for the lower intensity values.

However, the present invention seeks to maintain 8-bit communication, storage and/or processing paths downstream of this conversion.

As the higher order bits in a 10-bit number are not utilized in the low intensity numbers, there is no difficulty in transmitting or storing the 10-bit solution on an 8-bit data channel. However, the higher order numbers can no longer be transmitted in full 10-bit form and, therefore, the preferred embodiment seeks to compress those higher order numbers to allow transmission or storage on a lower order data system such as an 8-bit data system.

The consequence of such compression is a loss of some significant digits on higher order numbers. However, as the input data and the 10-bit output has a much greater number of significant digits to work with, the loss of significance on those larger numbers may only create small percentage errors in the actual output.

As shown by the plot 5 in FIG. 2, the lower order numbers substantially correspond to those of a full 10-bit output. However, once the output reaches an area generally indicated by the arrow 6, an increase in errors occurs in comparison with the standard 8-bit output. There is a trade-off between gaining significantly greater accuracy on the error-ridden lower intensity values in return for some minimal increase in error in higher order numbers.

Figure 3:
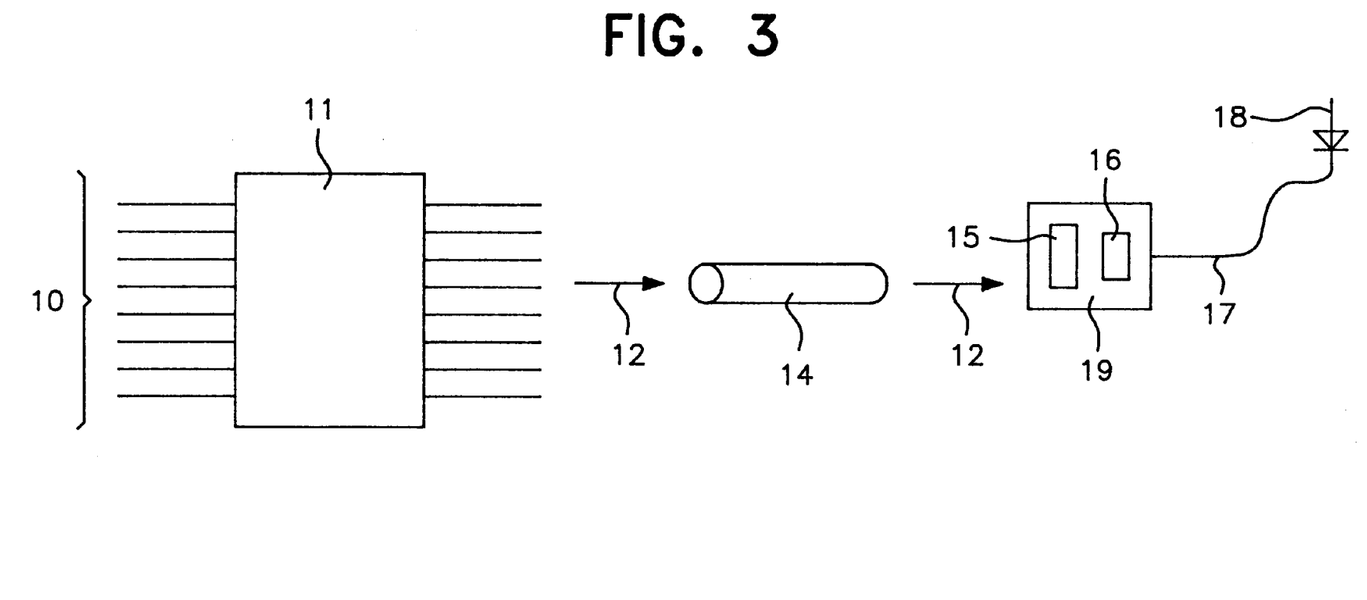
FIG. 3 shows a diagrammatic view of portions of the apparatus in accordance with one embodiment of the invention.

A general description of the apparatus is outlined in FIG. 3. This apparatus relates to a preferred form of the invention where the original input is converted to an 8-bit digital signal and subsequent processing is also desired to utilize 8-bit technology. However, it will be readily appreciated that the methodology of the invention can be applied to other bit combinations.

As shown in FIG. 3, an initial non-linear video signal may have already been provided as an 8-bit digital signal 10. This may be provided to a programmable memory apparatus for a logic circuit to apply the anti-gamma function such as an Eprom 11. In the preferred form, this Eprom 11 also applies the compression method described subsequently.

The output from the Eprom 11 is again an 8-bit data signal 12 that can be transmitted along a standard 8-bit communication path 14 to a control board 19 for a digital display. In this diagrammatic view, the digital display is indicated generally by a single LED 18 driven by the control board 19. Of course, a plurality of such LEDs are driven by a single control board in practice and indeed the same consideration applies to digital displays other than LED screens such as LCDs, LCD projectors, plasma television OLEDs, digital mirror devices and others.

Also, the same applies if the data is to be stored in an 8-bit system for subsequent use.

The control board 19 receives the 8-bit signal 12 that includes the compressed data as described subsequently. This may be provided to a decoder 15 that may have an 8-bit input and a 10-bit output. The 10-bit output contains uncompressed linear data values to drive the digital display and can be provided to a driving circuit 16. Typically, the driving circuit 16 will include apparatus to convert the incoming signal into a pulse width modulated signal sent through a communication path 17 to drive the LED 18.

In prior art solutions, the apparatus, aside from the decoder 15, could remain the same. However, if the data path 14 was to be kept as an 8-bit data path, a loss of significance on low intensity values as shown in FIG. 1 creates mach banding in the output display.

The alternative was to provide a 10-bit output from the Eprom 11. However, it either requires an increase in the data path 14 to 10-bit capability or, the Eprom 11 needed to be positioned further downstream such as on the control board 19. Once a plurality of control boards are considered for driving a large display, this multiplies the need for such Eproms 11 onto each of the control boards.

To overcome this difficulty, the present invention uses the Eprom 11 to manipulate the digital data and provides some data compression.

In essence, the incoming 8-bit data signal 10 may be manipulated to remove the gamma function and temporarily provided as a10-bit value. It will be appreciated that at the lower intensity values, the higher order bits in a10-bit number are 0 in any case. Therefore, there is no difficulty in providing the 10-bit value corresponding to the lower intensity numbers directly through an 8-bit output and the 8-bit data path 14.

This is not the case with higher intensity values that require the higher order bits to be transmitted. The present invention sets a threshold value such that the higher data values above that threshold are compressed losing the lowest order bits of the 10-bit number and also transmitted over the 8-bit data path. By only losing the lowest order bits, the loss of accuracy is minimized.

All these may be decoded by the decoder 15 to reconvert the signals into appropriate 10-bit data that has retained the accuracy on the low intensity values and introduced smaller percentage errors compared with 8-bit data into the higher intensity values.

In addition to compressing the higher order numbers into a number suitable for transmission on an 8-bit data channel 14, the data channel 14 also carries an identifier in this preferred form such that the identifier indicates whether the data stream is an uncompressed number with the higher order 0 bits omitted or, a compressed number that requires subsequent decoding. On that basis, in this preferred example, one of the 8-bit data channels output from the Eprom 11 is used as the indicator so that only the remaining seven data bits are used for actual transmission of the data values themselves whether they be compressed or uncompressed.

The method of the present invention seeks to provide uncompressed data below a particular threshold and compressed data above that threshold at the loss of the lowest significant bits in the number. This preferred form manipulates a 10-bit linearized output to provide this over the conventional 8-bit data path and include an indicator bit to reduce the available data bits in the path to seven. If it is intended to maximize the accuracy of the lower order numbers, as many of these as is possible should be provided in an uncompressed state. With seven bits available to transmit the actual data, it will be readily appreciated that the most convenient threshold value may be 128 as 127 is the maximum number capable of representation by seven binary digits. Although this value particularly suits this embodiment, other combinations of input and desired output bits may provide different threshold values. In general, it is intended that the threshold value be set at less than or equal to $2^{n-1}$ where n is the order of the downstream data path 14 or downstream data storage system. The most preferred arrangement is when the threshold value equals $2^{n-1}$ if a single threshold value is to be used.

It should also be noted that the method may be used in alternative stages, particularly for even higher order bit combinations. For example, it may be possible to set a first threshold below which no compression occurs, a second threshold so that values intermediate of the two threshold values receive a first degree of compression and values above the second threshold receive higher compression.

Using such a system, 12-bit data may be provided on an 8-bit system as an example. To accommodate at least one extra indicator bit to allow multiple compression states to be shown, the data may require compression into six data channels or bits. The remaining two bits can indicate a maximum of four different states of compression. The data is compressed into $2^{n-m}$ bits where m equals the number of indicating bits. In this 8/12-bit example, threshold values may conveniently be provided as 64, 256, 1024 and 4096. All values in an initial 12-bit number that fall below 64 may remain uncompressed. Those between 64 and 256 may be divided by 4 to also range between 0 and 64. The values between 256 and 1024 may be divided by 16 and those between 1024 and 4096, by 64.

All values are now between 0 and 64 and can be stored or transmitted on 6 data bits or channels. The remaining two bits can indicate uncompressed or $1^{st}$, $2^{nd}$ or $3^{rd}$ degrees of compression.

Such an embodiment further enhances the accuracy of the lowest data values. Again, some additional errors are introduced and most apparent just beyond each new threshold value. However, the significant increase in low intensity accuracy may more than compensate.

In this 8-bit to 12-bit example, it can be seen that the threshold value has been chosen at 64 for the first threshold. This again corresponds to the maximum value transmittable on an 8-channel data path once two channels are now utilized for indicators to reduce the available channels to six. Although this is a maximum number for this example, the threshold can be lowered if desired. However, it is desired to maximize the number of values that are provided in uncompressed form to minimize potential errors and, therefore, the threshold will normally be taken at such a maximum available value.

The subsequent thresholds of 256 and 1024 are again arbitrary thresholds. It depends on the degree of compression desired to determine those threshold values. With two bits used as indicators, a maximum of four different uncompressed or compressed states can be indicated. The particular threshold values chosen provide relatively easy logic for decompression should it be preferred to implement this with a simple logic circuit rather than an Eprom or more complicated system. Similarly, the values by which the data is divided to provide the compression are kept at relatively easy values corresponding with bit boundaries. During the encoding, it makes little difference in this preferred example as the encoding step is performed at the same time as the more complicated linearization function so an Eprom is required in any case. Should the compression be performed subsequent to the linearization step, it may be performed by a relatively simple logic circuit also and again the use of values corresponding to bit boundaries make the logic easier. Of course, as it is intended to decompress in either case with a simple logic circuit, the use of bit boundary values assists in the process.

Figure 6:
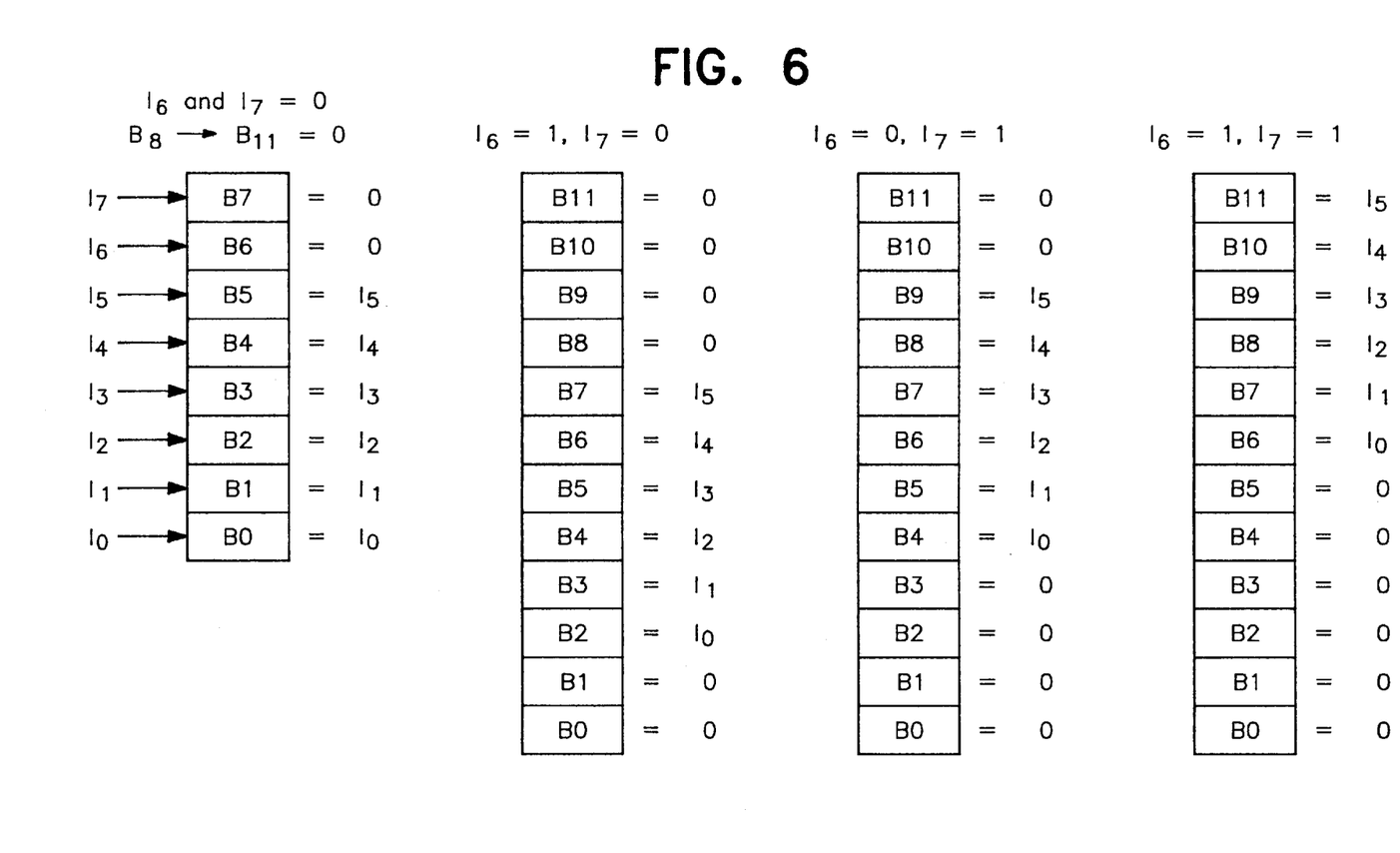
FIG. 6 shows a diagrammatic view of the logic of a portion of an apparatus to decode compressed values of a further embodiment.

The preferred form of this process is shown diagrammatically in FIG. 6. It can be seen that a compressed 12-bit value is transmitted on 8 bits where bits $I_0$ to $I_5$ are provided as the six data values and $I_6$ and $I_7$ are used as the indicator bits. The assignment of particular bits to carry the data or indicator values is entirely arbitrary.

Keeping the stages of compression and the various boundaries as outlined earlier in this embodiment, an active $I_6$ bit indicates the first stage of compression, an active $I_7$ bit and deactivated $I_6$ bit, the second stage of compression and both indicators as high values to represent the highest state of compression.

As four stages are available, values chosen have been arbitrarily chosen to the bit boundaries and compression states that apply to shifts of the data by two, four and six bits for each of the compressed states.

It can be seen from FIG. 6 that when $I_6$ equals one, the two lowest bits in the 12-bit output are set to zero and the data is mapped to the next six bits with the four upper bits equalling zero. This is effectively a multiplication by four to reverse the first compression state imposed. The next state of decompression requires shifting the data to further bits higher in the 12-bit output and, the final stage of decompression for the highest values places the six data bits in the highest six outputs with the lowest six outputs all equalling zero.

This particular example evenly splits the graduations between each compressed state. This need not necessarily be the case as there is a desire to minimize the compression applied to lower numbers and maximize the compression applied to higher numbers. A shift of the thresholds and compression values can provide alternative embodiments. Such an example of the 12-bit values discussed would be a first threshold of 64 as with the previous embodiment, a second threshold at 128 such that the values between 64 and 128 are divided by 2, a further threshold at 256 such that the 12-bit values between 128 and 256 are divided by 4 and all values over 256 divided by 64 to compress all remaining values into six data bits.

Such a change in the staggering of the thresholds and degrees of compression maximizes the accuracy of those values below 256 at a cost of even greater errors when the highest compressive ratio is first applied. The initial non-linear data that corresponds to a linearized 12-bit value just over 256 would then suffer the most from an increase in errors compared with the previous embodiment. Nevertheless, as the nature of the anti-gamma function creates maximum errors in the lowest values, this may be a preferred alternative.

Utilizing a single threshold value of 128 as described, the preferred form of this invention may convert the 8-bit incoming data 10 into a linearized 10-bit number. If that number is less than the threshold value of 128, this number may be output directly on seven of the eight output channels.

For values greater than or equal to 128, the 10-digit number needs to be reduced to a value capable of being represented by only seven binary digits. The easiest method of implementation is through the division of the 10-digit binary number so that the absolute values are reduced to values less than or equal to 127.

Although in theory the division can be by any suitable number which is subsequently reversed upon decoding, the easiest implementation is division by eight. It will be appreciated that the numeral 8 is represented by three binary digits and division by this number will immediately reduce a 10-binary digit number to seven binary digits. Division by a lower number may not provide sufficient compression and division by a higher number loses more accuracy than is necessary. Of course, the numeral 8 is used where a 10-digit number has been reduced to seven binary digits for transmission. Other bit combinations for different systems may have a different ideal value. For implementation with logic circuits, it is also easier to utilize a whole number corresponding to bit boundary, i.e. a value of $2^x$ where x is a whole number.

The final step of the encoding sequence performed by the Eprom 11 is to set an indicator bit such that the decoder 15 can recognize the incoming data as either an uncompressed number suitable for direct passage to the output or a compressed number requiring manipulation. Again, to facilitate easy operation, the preferred form utilizes the highest order data bit as the indicator bit. This allows the uncompressed numbers that have a maximum utilized bits over the seven lowest order bits to be transmitted directly and the upper bit used as the free indicator. Alternative mappings of the data to different bits are possible.

To set the highest order bit of the 8-bit output from the Eprom 11, the Eprom merely needs to add a value of 128 which sets the highest order bit as active and add this to the compressed 7-binary digit number carried on the remaining 7-bits.

In total, the encoding sequence performed by the Eprom 11 after linearization of the 8-bit data into 10-bit data proceeds as follows:

If X (10-bit)<128 then Output (8-bit)=X (10-bit),

Else Output (8-bit)=X (10-bit)/8+128.

The decoding apparatus 15 can simply work in reverse. This may be represented as follows:

If Input (8-bit)<128 then Output (10-bit)=Input (8-bit),

Else Output (10-bit)=(Input (8 bit)−128)×8.

It can be seen that in the encoding and decoding sequence, the addition and subtraction respectively of 128 is merely used to set the highest order bit active to indicate a compressed value. The compression and expansion of the values is performed by the division and multiplication by the value 8 respectively.

The addition of 128 can be performed by a logical "OR" to add this to the existing output number when appropriate.

As mentioned previously, the preferred form utilizes the Eprom 11 to both apply the anti-gamma function as well as perform the encoding sequence. The antigamma function is a complex function to linearize the data and can easily be performed by such an Eprom. In utilizing an Eprom, it is convenient to include the encoding sequence in the same apparatus although the encoding sequence can be performed by relatively simple logic circuits.

In contrast, the decoding is performed on individual control boards 19 and it is preferred to minimize the complexity of the hardware necessary for the decoder 15.

Figure 4:
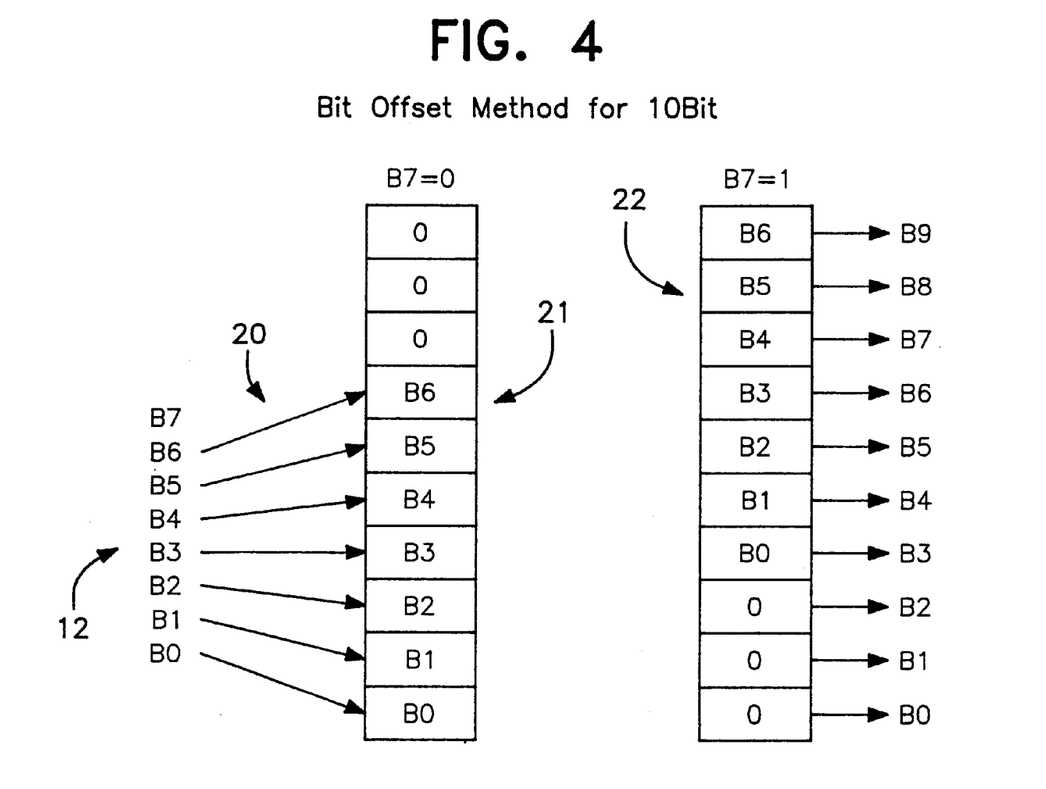
FIG. 4 shows a diagrammatic view of the logic of a portion of the apparatus to decode compressed values.

The methodology of a preferred decoder 15 is shown in FIG. 4. Referring to this figure, the initial mapping sequence 20 demonstrates the mapping of the 8-bit signal 12 to a suitable 10-bit number 21 in the case where bit 7, the highest order bit, is set at 0. In such an instance, bits 0 to 6 being the remaining seven data bits are mapped directly to the corresponding lowest seven bits of the 10-bit number 21. The upper three bits of the 10-bit number 21 are set at 0.

An alternative output 22 is shown if bit 7 from the incoming data 12 is shown to be 1. In that instance, the decoding sequence needs to multiply the incoming number by 8 which effectively shifts the seven received data bits into the top seven bits of the 10-bit output 22. It can be seen that the lower order bits, $B_0$, $B_1$ and $B_2$ are set at 0 and the others are mapped consecutively such that $B_0$ of the incoming data is mapped to $B_3$ of the 10-bit output.

The initial subtraction of 128 being the removal of the indicator bit can be performed by simply not mapping bit 7 of the incoming data to a particular output value. Instead, this bit is merely used as a switching bit in the logic circuit.

There remains some variations possible even within the preferred embodiment described thus far.

In performing the division by 8 to compress a 10-bit number into seven available data bits, it will be noted that the data below 128 is transmitted directly and no corresponding compressed value is necessary. Therefore, compressed values only are provided for the 10-bit numbers from 128 to 1023. After division by 8, the 8-bit data ranges from 16 to 127. The value 128 is added to set the top bit high so that the 8-bit data 12 relating to these compressed values ranges from the values 144 to 257. This is only 112 discreet values of the 128 possible values that can be transmitted in addition to the 128 uncompressed values.

The remaining 16 unused values may be utilized for other functions in the data transmission if desired. Furthermore, these additional 16 values that cannot represent a particular data value can be made available at different portions in the data spectrum.

In the embodiment described thus far, the 8-bit data values output from the Eprom 11 comprise uncompressed values 0 to 127 and compressed values 144 to 255. Hence the values 128 to 143 are available for additional function.

If it is preferred, the compressed values 144 to 255 may be shifted through a simple subtraction of the value 16 so that they are transmitted as values 128 to 239 and leave the uppermost values available for other function. This may provide easier selection of those upper numbers for alternative functions.

Furthermore, it may be noted that it is logically possible to cause the shift prior to the compression which, in this example, is performed by division by the number 8. If desired, the 10-bit numbers intended for compression may have the value 128 subtracted from them prior to division by 8 and subsequent addition of 128. As the initial 128 is subtracted prior to division, it will be appreciated that this creates the same shift as subsequent subtraction by 16. This shifting of the discreet values can be reversed upon decoding and is merely provided if additional functionality is intended for the unused 8-bit data values and there is a preference in the particular data values that may be used for the increased functions.

It should also be noted that the shift of the data values explained in the previous embodiment may be provided simply for continuity of data through the 8-bit data path rather than for utilization of the additional values. It may simply be desirable to transmit data across that path from the value of 0 to 239.

Figure 5:
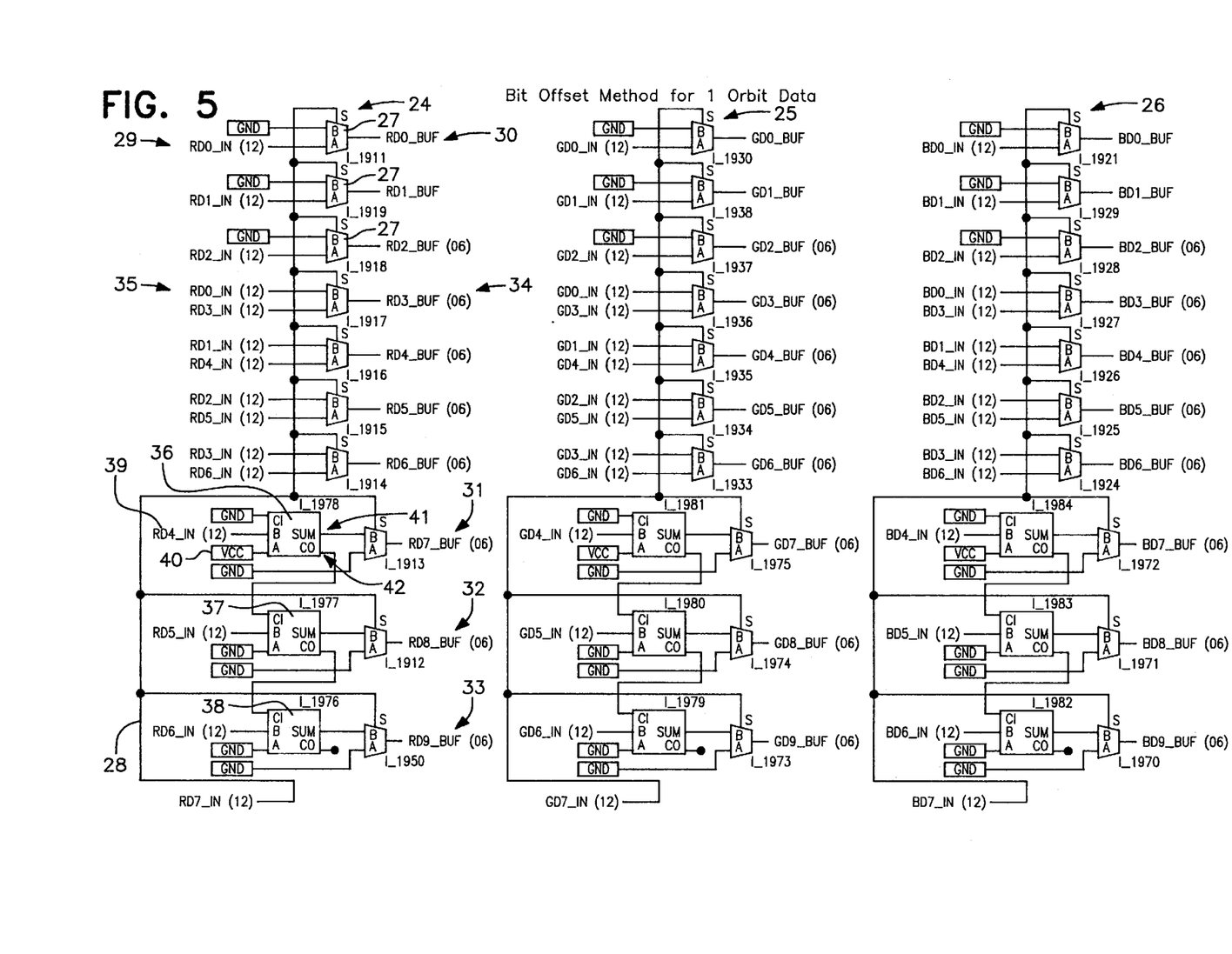
FIG. 5 shows a logic circuit for three separate encoded data streams to implement the decoding of FIG. 4.

Referring to FIG. 5, a logic circuit is shown to implement the decoder as generally previously described.

In this particular embodiment, three identical decoders 24, 25 and 26 are shown. When manipulating data for a digital display, the data is generally split into individual data streams relating to individual colours, such that the mix of intensity of those colours determines the final combined colour of the pixel. For this reason, a separate decoding logic circuit 24, 25 and 26 is provided for the red, green and blue data paths respectively. Other colour differentials can be used.

Further explanation of the logic circuit will be made with reference to the circuit intended for the red colour being circuit 24.

As shown in this circuit, multiple switches 27 are provided to select between alternative inputs. The input comes in the form of an 8-bit number for which the top bit is used to indicate whether or not the remaining seven numbers are in an uncompressed or compressed state.

The top bit from the incoming data activates communication path 28 linked to each of the switches 27.

If the top bit in the incoming data is 0, the "A" input is selected from each of the switches 27. Considering the input 29, this is the lowest order bit from the data path and provided the communication path 28 is not active, this indicates that the seven data bits should be provided directly to the lowest seven data bits of the output 10-bit number.

Hence the output 30 directly corresponds with the input 29. This also applies for the remaining switches 27 or all of the lowest seven bits.

As the received number, if communication path 28 is not active, it is known to be a 10-bit number having a value less than 128, outputs 31, 32 and 33 for the top three bits of the 10-bit number are also selected as the lower input "A" that is set to ground for a zero value.

The alternative circumstance occurs should the indicator bit, being the highest order bit in the incoming data stream in this preferred embodiment, be active. In that case, communication path 28 is set to a high value and the "B" inputs are selected by each of the switching mechanisms 27.

It is intended to uncompress such a data value by effectively multiplying the number by 8. This involves simply shifting the inputs and matching with an output three bits higher than the input. The lowest three inputs should all be set to zero.

Referring to output 30, it can be seen that the input "B" is set to ground or zero and this is repeated for the first three data bits.

Referring to the output 34, the "B" input 35 is now set to the lowest order data bit from the incoming data stream. Each subsequent bit is similarly mapped to step the incoming data values three orders higher to provide the 10-bit output. In its simplest form, this is the only decoding necessary in this embodiment.

It can be seen that this particular embodiment includes a more complex structure for the upper three bits of the 10-bit number. This more complex structure is due to the subtraction of the value 128 from the linearized 10-bit number prior to compression and transmission. This relates to the embodiment discussed previously where the compressed data is shifted to run continuous from the uncompressed data. To then decode that initial subtraction, it is necessary to add 128 to obtain the final decoded 10-bit number.

To achieve this, a "1" needs to be added to the eighth bit of the 10-bit number to produce the correct output 31. This can be performed by the circuit 36 and, as the addition of one may also cause a carryover in the binary number, subsequent circuits 37 and 38.

To provide identical circuits 36, 37 and 38, the circuit 36 includes three inputs although only two are necessary for the summation. One of these inputs being input "CI" relating to a carryover input is set to zero on the first circuit 36. Additional inputs are received from the appropriate input data bit 39 and an additional input 40 that can be set at "1". As input "CI" is set to zero, the summation is performed of inputs 39 and 40 and represented by the two output bits 41 and 42. Output 41 represents the correct value following the summation for the output 31. The output 42 holds a carryover value if appropriate and inputs this to the input "CI" on the subsequent circuit 37.

As the "1" only needs to be provided to the output 31, the corresponding "A" inputs on the following two circuits 37 and 38 are set to zero. Therefore, the circuits effectively simply add the carryover value to the input data values and output the value for that bit plus any necessary carryover value as required. The final carryover value from circuit 38 is simply terminated as this is not a possible solution for output in the 10-bit number.

Thus it can be seen that the invention provides a method and an apparatus by which the linearized data for a digital display can be maintained with a lower order transmission or storage such as 8-bit transmission or storage despite obtaining the accuracy of 10-bit numbers for the lower intensities. This is traded for some slight degradation of available discreet values at higher intensities.

The invention also provides a relatively simple logical operation that allows simple decoding to reduce costs at multiple decoding points if multi-panel or multi-control board displays are utilized.

It will be appreciated that preferred embodiments of this invention have been described although the invention is not intended to be restricted to those particular embodiments. Special integers referred to throughout the description are deemed to include known equivalents where appropriate and particular values referred to throughout the description may be purely illustrative of particular embodiments.

What is claimed is:

1. A method to transmit or store image data for display on a digital display system comprising:
    applying an anti-gamma function to linearize an incoming data value and providing said linearized value as a higher order number;
    receiving said linearized higher order number and, if below at least a first threshold value capable of being transmitted or stored on a lower order data system, transmitting or storing said linearized higher order number on said data system for use with a digital display system; and
    compressing said higher order numbers above said at least first threshold to also fit said lower order data system for storage or transmission and subsequent uncompression and use with said digital display system.

2. A method to transmit or store image data for display on a digital display system as claimed in claim 1 wherein said at least first threshold value is set to a value less than or equal to a value transmittable or storable on a data system of n−1 channels or bits where n equals the maximum order of the lower order data system.

3. A method to transmit or store image data for display on a digital display system as claimed in claim 1 wherein said higher order values above said first threshold are compressed to values transmittable or storable on a data system of n−1 channels where n equals the maximum order of the lower order data system.

4. A method to transmit or store image data for display on a digital display system as claimed in claim 1 wherein said threshold value is set to a value corresponding to a value represented by a single active bit in a binary sequence being a value of $2^x$ where x is a whole number.

5. A method to transmit or store image data for display on a digital display system as claimed in claim 4 wherein said x equals n−1.

6. A method to transmit or store image data for display on a digital display system as claimed in claim 1 wherein said uncompressed and said compressed values are transmitted or stored on n−1 channels and the remaining channel is used to indicate the state of compression of the value.

7. A method to transmit or store image data for display on a digital display system as claimed in claim 1 wherein said at least first threshold value is set to a value less than or equal to a value transmittable or storable on a data system of n−m channels or bits where n equals the maximum order of the lower order data system and m equals the minimum number of channels or bits to indicate the number of stages of compression.

8. A method to transmit or store image data for display on a digital display system as claimed in claim 7 where said at least first threshold value equals the number of values transmittable or storable on a data system of n−m channels or bits and subsequent threshold values equal said first threshold value multiplied by $2^x$ where x is a whole number.

9. An apparatus to transmit or store image data for use with a digital display system comprising:

conversion means to apply an anti-gamma function and linearize a data value to a linearized higher order number;

selection means to select said linearized higher order numbers, if below at least a first threshold value capable of being transmitted or stored on a lower order data system, transmit or store said linearized higher order number on said data system for use with a digital display system;

compression means to compress said linearized higher order numbers above said at least first threshold value to also fit said lower order data system for storage or transmission and subsequent uncompression and use with said digital display system; and output means connectable to a lower order communication or storage system to transmit or store said selected and said compression values.

10. An apparatus to transmit or store image data for use with a digital display system as claimed in claim 9 wherein said conversion, selection and compression is performed by a programmable memory apparatus.

11. An apparatus to transmit or store image data for use with a digital display system as claimed in claim 10 wherein said programmable memory apparatus comprises an Eprom.

12. An apparatus to transmit or store image data for use with a digital display system as claimed in claim 9 wherein alternatively, said conversion, selection and compression may be performed, at least in part, by a logic circuit.

13. An apparatus to transmit or store image data for use with a digital display system as claimed in claim 9 wherein said selection selects according to at least a first threshold value less than or equal to the maximum value transmittable or storable on n−1 channels where n equals the order of said lower order system.

14. An apparatus to transmit or store image data for use with a digital display system as claimed in claim 13 wherein at least one remaining channels is used to indicate the compression state of the value.

15. An apparatus to transmit or store image data for use with a digital display system as claimed in claim 9 wherein said selection selects according to at least a first threshold value less than or equal to the maximum value transmittable or storable on n−m channels where n equals the order of the lower order system and m equals the minimum channels or bits necessary to represent the number of compressed or uncompressed states.

16. An apparatus to transmit or store image data for use with a digital display system as claimed in claim 15 wherein said at least first threshold value is said to permit the maximum number of values to be transmitted or stored on n−m channels or bits and wherein subsequent threshold values equal said first threshold value multiplied by $2^x$ where x is a whole number.

17. An apparatus for the uncompression of transmitted or stored linearized data from a lower order data system into a higher order data system for use with a digital display where said linearized data comprises uncompressed values below at least a first threshold and compressed values above said at least first threshold and an indicating bit or bits to indicate the state of compression of the value comprising:

switching means driven by said indicating bit or bits to select between at least two separate logic operations for incoming linearized data values;

a direct output of said incoming value if said switching means indicates an uncompressed value has been received; and decoding bits of said lower order incoming values to higher order bits of said higher order data system if said indicating bit or bits indicate a compressed value.

18. An apparatus as claimed in claim 17 wherein said direct output of uncompressed values comprises logically connecting lower order bits of said incoming value to corresponding lower order bits of said higher order value and setting remaining bits of said higher order value to zero.

19. A method for the uncompression of transmitted or stored linearized data from a lower order data system into a higher order data system for use with a digital display where said linearized data comprises uncompressed values below at least a first threshold and compressed values above said at least first threshold and an indicating bit or bits to indicate the state of compression of the value comprising:

utilizing said indicating portion to switch the output between at least two alternative inputs;

a direct output of the incoming value if the indicating portion indicates an uncompressed value; and decoding incoming data bits to higher order output data bits if said indicating bit or bits indicates a compressed value.

20. An apparatus to transmit or store image data for use with a digital display system comprising:

conversion means to apply an anti-gamma function and linearize a data value to a linearized higher order number;

selection means to select linearized higher order numbers below at least a first threshold value;

compression means to compress said linearized higher order numbers above said at least first threshold value;

output means connectable to a lower order communication or storage system to transmit or store said selected and said compressed values; and said selection selects according to at least a first threshold value less than or equal to the maximum value transmittable or storable on n−1 channels where n equals the order of said lower order system.

* * * * *